United States Patent [19]

Sawada et al.

[11] Patent Number: 5,296,260
[45] Date of Patent: Mar. 22, 1994

[54] METHOD OF MANUFACTURING INORGANIC INSULATION

[75] Inventors: Kazuo Sawada; Shinji Inazawa; Kouichi Yamada, all of Osaka, Japan

[73] Assignee: Sumitomo Electric Industries, Ltd., Osaka, Japan

[21] Appl. No.: 743,429

[22] PCT Filed: Dec. 26, 1990

[86] PCT No.: PCT/JP90/01701
§ 371 Date: Aug. 22, 1991
§ 102(e) Date: Aug. 22, 1991

[87] PCT Pub. No.: WO91/10239
PCT Pub. Date: Jul. 11, 1991

[30] Foreign Application Priority Data

Dec. 28, 1989 [JP] Japan .................................. 1-341394
Dec. 26, 1990 [JP] Japan .................................. 1-341392

[51] Int. Cl.$^5$ ............................................. B05N 5/12
[52] U.S. Cl. ..................................... 427/118; 427/120; 427/126.3; 427/376.4; 427/387; 427/419.3; 427/427; 427/435; 205/188; 205/209
[58] Field of Search ............... 427/120, 126.3, 376.4, 427/419.3, 387, 435, 118, 427; 205/188, 209

[56] References Cited

U.S. PATENT DOCUMENTS

| | | | |
|---|---|---|---|
| 4,269,894 | 5/1981 | Sakai et al. | 427/118 |
| 4,468,420 | 8/1984 | Kawahara et al. | 427/397.7 |
| 4,476,192 | 10/1984 | Imai et al. | 427/118 |
| 4,983,423 | 1/1991 | Goldsmith | 427/383.3 |
| 5,105,531 | 4/1992 | Sawada et al. | 427/118 |
| 5,112,676 | 5/1992 | Cot et al. | 427/126.3 |
| 5,139,820 | 8/1992 | Sawada et al. | 427/120 |

FOREIGN PATENT DOCUMENTS 63-195283 8/1988 Japan .
63-237404 4/1989 Japan .

*Primary Examiner*—Shrive Beck
*Assistant Examiner*—Benjamin L. Utech
*Attorney, Agent, or Firm*—W. G. Fasse

[57] ABSTRACT

A solution of a ceramics precursor prepared from at last one or two types of metal alkoxides or metal acylates is applied onto a ceramics film having irregularity on its surface, which is formed on a conductor surface, to fill up irregular portions of the surface. This ceramics precursor solution is at least partially changed to a ceramics state by heating. The surface is smoothed by such application of the ceramics precursor solution, and general disadvantages of weakness against rubbing and inferiority in workability can be improved. Further, it is possible to improve an outgassing property.

14 Claims, 1 Drawing Sheet

METHOD OF MANUFACTURING INORGANIC INSULATION

TECHNICAL FIELD

The present invention relates to a method of manufacturing an inorganic insulation such as a heat resistant wire/coil etc., a radiation resistant wire or coil which is related to nuclear power, or a wire or coil for a vacuum apparatus, or the like.

BACKGROUND ART

As a conventional heat resistant wire etc., there is an MI cable, a fiber-glass braided wire, or a wire passing a ceramics tube. However, such a wire is bulky and disadvantageous in view of space. Further, the wire has such a disadvantage that its configuration is apt to be restricted to a round wire.

While a heat resistant organic wire whose surface is coated with an organic material is also known, such a wire cannot withstand a temperature exceeding 300° C., and has a problem in heat resistance. Further, discharge of cracked gas, as well as discharge of adsorbed gas come into question.

As to a heat resistant wire, known are a method of applying a ceramics precursor which is prepared by a sol-gel method to a surface, and a Nippon Sheet Glass method [Liquid Phase Deposition (LPD) method]. However, these methods have such problems that it takes time for increasing film thicknesses.

Known is a method of applying a material which is obtained by mixing ceramics particles into silicone resin onto the surface of a wire or the like and thereafter heating/firing the same. According to this method, however, there is such a problem that the surface of the wire or the like is irregularized and roughened, and weakened against rubbing. It also has a problem in view of flexibility.

Also when films are formed by a spraying method and a sintering method, surfaces are irregularized or made porous. Thus, similar problems are caused.

DISCLOSURE OF THE INVENTION

An object of the present invention is to provide a method of manufacturing an inorganic insulation which is easy to industrialize, improved in workability, as well as improved in insulability and reliability of non-outgassing property.

The manufacturing method according to the present invention comprises a step of forming a ceramics film having irregularity on its surface on a conductor surface, a step of applying a solution of a ceramics precursor prepared from at least one or two types of metal alkoxides or metal acylates onto the ceramics film for filling up irregular portions on the surface of the ceramics film, and a step of at least partially changing the solution of the ceramics precursor to a ceramics state by heating.

In the present invention, the ceramics film having irregularity on its surface indicates such a state that Ra of the surface of the ceramics film is at least 1 μm.

In the present invention, further, a porous ceramics film is included in the ceramics film having irregularity on its surface.

In a first embodiment according to the present invention, it is possible to form a ceramics film by a spraying method, a particle sintering method or an electric deposition method.

In the present invention, the conductor in a state after formation of ceramics may be worked into a desired configuration before application of the ceramics precursor solution.

In a second embodiment according to the present invention, the ceramics film is formed by applying a mixture of silicone resin and ceramics particles and/or ceramics fiber onto the surface of the conductor, performing first heat treatment within such a temperature range that the silicone resin is not changed to a ceramics state for forming a film, and further performing second heat treatment for changing the same to a ceramics state.

When it is desirable to work the conductor into a desired configuration in this embodiment, the conductor is preferably worked into a desired configuration after the first heat treatment and before the second heat treatment.

In this embodiment, a condition for the second heat treatment is preferably a condition of changing at least 90% to a ceramics state.

As to the ceramics precursor, there is a precursor which is prepared from an alkoxide or an acylate of Si, Al, Zr, Ti, or Mg, for example.

The conductor employed in the present invention is preferably prepared from Cu which is coated with a metal having heat resistance and oxidation resistance, for example. As to metals having heat resistance and oxidation resistance, there are Ni, Pt, and stainless steel, for example.

According to the present invention, the conductor can be prepared from an anodizable metal or Cu which is coated with such a metal. It is possible to improve adhesion with the ceramics film which is formed on the conductor surface, by anodizing the surface of the conductor.

The electric deposition method, which is illustrated as a method of forming the ceramics film, is a method of dipping Al in an aqueous solution containing silicate in the case of $Al_2O_3$ or $SiO_2$, for example, using this as a cathode for feeding a current, and causing spark discharge, thereby depositing an $Al_2O_3$ film or an $SiO_2$ film.

According to the present invention, the solution of a ceramics precursor is applied onto the ceramics film having irregularity on its surface, for filling up irregular portions of the surface. Due to such application, it is possible to smooth the surface of the conductor, and to improve the general disadvantages of weakness against rubbing and inferiority in workability. Further, it is possible to improve the outgassing property.

It is possible to partially change the ceramics precursor to a ceramics state and to bring the same into a gel state having flexibility for forming a part of the film, thereby implementing a film having flexibility as a whole, by selecting the condition for the heat treatment after application of the ceramics precursor.

According to the second embodiment of the present invention, the mixture of silicone resin and ceramics particles and/or ceramics fiber etc. is applied and thereafter the ceramics film is formed by heat treatment, whereby it is possible to easily form a thick ceramics film.

BEST MODES FOR CARRYING OUT THE INVENTION

First, examples according to the first embodiment of the present invention are described.

EXAMPLE 1

Figure 1:
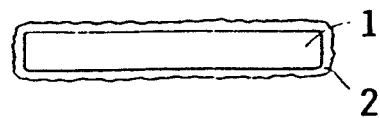
FIG. 1 is a sectional view showing a state before a solution of a ceramics precursor is applied in example of the present invention.

$Al_2O_3$ was coated on the surface of a copper plate (6 mm in thickness, 200 mm in width) by a plasma spraying method in a thickness of about 0.5 mm, excepting a terminal part. At this time, the film surface had irregularity with Ra of several $\mu$m, and the film itself was porous. This state is shown in FIG. 1 with a sectional view. Referring to FIG. 1, a ceramics film 2 is formed on the surface of a conductor 1. In this example, the conductor 1 is a copper plate, and the ceramics film is an $Al_2O_3$ coating layer.

Figure 2:
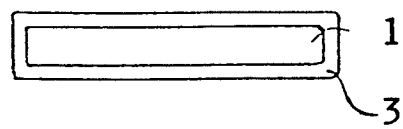
FIG. 2 is a sectional view showing a state after the solution of the ceramics precursor is applied and fired also in Example of the present invention.

Then, a ceramics precursor prepared by adding ethyl alcohol and small amounts of water and nitric acid to tetraethoxysilane was impregnated into porous portions of the ceramics film of the copper plate coated with $Al_2O_3$ as described above, and applied to fill up the irregularity on the surface of the ceramics film. After the application, heat treatment was performed at 600° C. As the result, obtained was an insulation whose surface was smooth with no holes. Ra of the surface was 0.2 $\mu$m. This inorganic insulation is shown in FIG. 2 with a sectional view. Referring to FIG. 2, an insulating layer 3 is formed around a conductor 1. The insulating layer 3 is an insulating layer which is formed by coating an $Al_2O_3$ coating layer with $SiO_2$.

The as-obtained inorganic insulation was used as a bus bar, whereby the same was recognized to be preferable as a bus bar in a high-temperature atmosphere and for a heavy current with excellent insulation characteristics even if the temperature was in excess of 300° C., although a conventional PVC-coated one was not employable unless the temperature was less than 100° C.

EXAMPLE 2

A nickel-plated copper wire of 1.0 mm in wire diameter was electropolished in a dilute sulfuric acid bath of 60 wt. % with a current density of 50 A/cm$^2$ for about 30 seconds, using a base material as an anode. Thereafter the same was dipped in colloid which was prepared by mixing 5 g of aluminum nitrate as well as alumina powder of 0.3 $\mu$m in mean particle diameter to 100 ml of ethyl alcohol, 100 ml of water, 4 ml of isopropyl alcohol and 3 ml of methyl ethyl ketone, and 50 V was applied to a base material which is an anode, to perform electrodeposition of the alumina powder.

Figure 3:
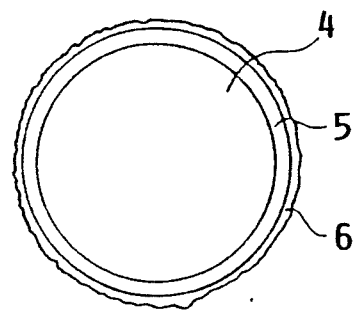
FIG. 3 is a sectional view showing a state before a solution of a ceramics precursor is applied in another Example of the present invention.

As the result, an extremely irregular aluminum powder coating was formed on the surface. FIG. 3 shows a sectional view of this coating. Referring to FIG. 3, an Ni-plated layer 5 is formed around a Cu wire 4, and a conductor is formed by the Cu wire 4 and the Ni-plated layer 5. An electrodeposition layer 6 is formed on the surface of the Ni-plated layer 5. Ra of the surface of this electrodeposition layer 6 was 2 to 3 $\mu$m.

Then, this alumina powder coating was dipped in a solution, which was prepared by reacting a mixed solution of 5 mole percent of tributoxy aluminum, 10 mole percent of triethanol amine, 5 mole percent of water and 80 mole percent of isopropyl alcohol at a temperature of 50° C. for 1 hour, and thereafter fired. The firing was carried out in the atmospheric air at a temperature of 500° C.

Thus, a smooth (Ra=0.1 $\mu$m) alumina powder alumina impregnated insulating layer of 20 $\mu$m in film thickness was formed on the surface.

Figure 4:
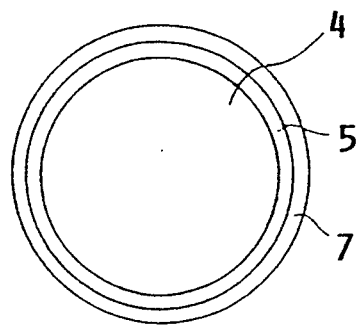
FIG. 4 is a sectional view showing a state after the solution of the ceramics precursor is applied and fired also in another example of the present invention.
Figure 1:
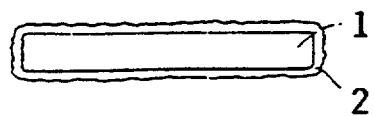
Figure 2:
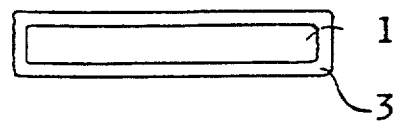
Figure 3:
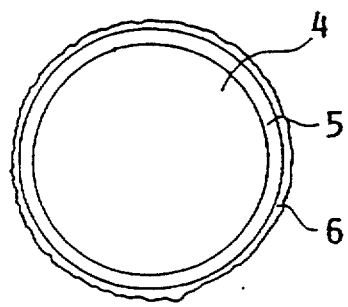
Figure 4:
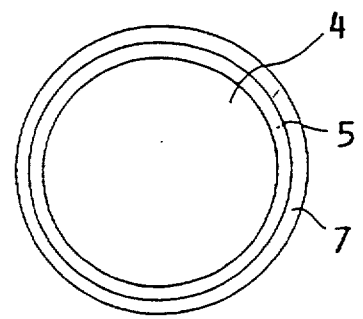

This state is shown in FIG. 4 with a sectional view. Referring to FIG. 4, an insulating layer 7 is a layer which is formed after applying a ceramics precursor onto the electrodeposition layer 6 and firing the same.

EXAMPLE 3

$Al_2O_3$ was sprayed to SUS clad copper, and a solution of a ceramics precursor was prepared by adding nitric acid to a solution, which was prepared by mixing tetrabutylorthosilicate:water:isobutyl alcohol = 8:32:60 (molar ratio), at a rate of 3/100 mol. with respect to tetrabutylorthosilicate and thereafter heating the same at a temperature of 80° C. for 2 hours, and this solution of the ceramics precursor was applied thereto and thereafter fired. The as-obtained substance was used as a bus bar, and a heat resistant wire, whereby excellent results were obtained.

EXAMPLE 4

Ti clad copper was anode-rayed and brought into a porous state, and a solution of a ceramics precursor which was similar to that of Example 3 was applied thereto, and this was fired and thereafter used as a bus bar and a heat resistant wire, whereby excellent results were obtained.

EXAMPLE 5

A porous $SiO_2$ film was formed on an Al/Ni/Cu clad wire by an electric deposition method, and a solution of a ceramics precursor which was similar to that of Example 3 was applied thereto and fired. The as-obtained wire was used as a bus bar and a heat resistant wire, whereby excellent results were obtained.

EXAMPLE 6

$A_2O_3$ was sprayed to a thermocouple, and a solution of a ceramics precursor which was similar to that of Example 3 was applied thereto, and this was fired and used as a thermocouple, whereby an excellent result was obtained.

EXAMPLE 7

A conductor which was used as a base material for applying the solution of the ceramics precursor in Example 3 to Example 6 was used, while a solution which was obtained by mixing tributoxy aluminum:triethanol amine:water:isopropyl alcohol = 5:10:5:80 in molar ratio was heated/stirred at a temperature of 50° C. for 1 hour to prepare a solution of a ceramics precursor, and this was applied to the conductor, fired and used as a bus bar, a heat resistant wire or a thermocouple, whereby an excellent result was obtained.

Examples according to the second embodiment of the present invention are now described.

EXAMPLE 8

A solution was prepared by homogeneously mixing fine grains of $Al_2O_3$ of 1 μm in particle diameter of a 30% toluene solution of silicone resin by 30 parts by weight with respect to silicone resin. This solution was continuously applied to an Ni clad Cu wire of 0.5 mm in outer diameter. Then this was heated in a continuous baking furnace whose furnace temperature was 500° C., to change the film of silicone resin to a ceramics state. The thickness of the ceramics layer of this wire was about 15 μm, and its breakdown voltage was 350 V.

In this state, the ceramics coating layer was apt to be eliminated in a powder form or a granular form with respect to bending, attended with difficulty in handling.

A solution which was prepared by adding an isopropyl alcohol solution of tetraethoxysilane, water and a small amount of nitric acid was further continuously applied onto this wire, and heated in a heating furnace whose temperature was 600° C., to produce a wire having an insulating layer whose apparent thickness was 18 μm in total. The surface of this wire was smooth. Further, this wire hardly caused peeling and elimination of ceramics with respect to bending. In addition, its breakdown voltage (B.D.V.) was 700 V.

EXAMPLE 9

$SiO_2$ powder of 0.7 μm in particle diameter was homogeneously mixed to a paraxylene 50% solution of silicone resin by 20 parts by weight with respect to silicone resin, and this was applied to an Ni-plated Cu wire of 1 mm in diameter, heated at 150° C. for 30 minutes to be worked into a coil, and further heated at 400° C. for 30 minutes.

A ceramics precursor solution was prepared by heating and stirring a solution, which was obtained by mixing tributoxy aluminum:triethanol amine:water:isopropyl alcohol = 5:10:5:80 in molar ratio, at a temperature of 50° C. for 1 hour, and this ceramics precursor solution was applied onto the surface of the aforementioned coil, and heated at 400° C. for 30 minutes.

The coil, which was thus coated with the ceramics precursor solution and baked, and a coil, which was in a state before application of the ceramics precursor solution, were subjected to an experiment of generating a magnetic field in a vacuum in the following manner:

The coils were set in a vacuum vessel of 9.4 l, and the vessel was evacuated to feed a direct current of 20 A to the coils upon reaching $10^{-8}$ Torr and baking was performed for 2 hours. About 1 hour was required to reach $10^{-9}$ Torr in the case of the coil which was in the state before application of the ceramics precursor solution, while it took about 5 minutes in the case of the coil which was prepared by applying the precursor solution. From this, it is understood that the surface of the coil which was coated with the precursor solution and sintered is extremely smooth, and excellent in vacuum characteristic.

INDUSTRIAL APPLICABILITY

As hereinabove described, the inorganic insulation obtained according to the present invention is excellent in heat resistance, insulability, oxidation resistance and flexibility. Therefore, it is effective when applied to a radiation resistant wire or coil which is related to nuclear power, or a wire or coil for a vacuum apparatus etc.

We claim:

1. A method for manufacturing on an electrical conductor an inorganic insulation with a smooth surface finish measured as a finish surface roughness Ra2, comprising the following steps:
    (a) forming a ceramic coating film on said electrical conductor, mixing silicone resin with ceramic particles and/or ceramic fibers to form a mixture, applying said mixture to said electrical conductor to form a coating film, first heating said coating film at a first temperature sufficiently low so that said silicone resin is not changed into a ceramic state and then second heating said coating film at a second higher temperature to convert said silicone resin into said ceramic coating film with said ceramic particles and/or fibers embedded in said ceramic coating film, whereby said ceramic coating film has a film surface with an initial surface roughness Ra1,
    (b) preparing a solution of a ceramic precursor selected from the group consisting of metal alkoxides and metal acylates,
    (c) applying said ceramic precursor solution to said film surface of said ceramic coating film, and
    (d) heating said ceramic precursor solution sufficiently to convert said ceramic precursor solution at least partially to a ceramic state, whereby said initial surface roughness Ra1 is reduced and a smooth, dense composite insulator layer is formed on said electrical conductor, wherein said finish surface roughness Ra2 is smaller than said initial surface roughness Ra1.

2. The method of claim 1, wherein said ceramic coating film is formed so that said initial surface roughness Ra1 forms pores in said ceramic coating film, and wherein said ceramic precursor solution is caused to fill said pores to smooth said initial surface roughness Ra1.

3. The method of claim 1, further comprising working said electrical conductor into a configuration following said step of forming said ceramic coating film and prior to said step of applying said ceramic precursor solution.

4. The method of claim 1, wherein said step of applying said ceramic coating film is performed by any one of the following: spraying, sintering, and electric deposition.

5. The method of claim 1, further comprising working said electrical conductor wire into a configuration between said first and second heating.

6. The method of claim 1, wherein said step of applying said ceramic precursor solution is performed by dipping said electrical conductor with said ceramic coating film thereon, into said ceramic precursor solution.

7. The method of claim 1, wherein said metal alkoxide is selected from the group consisting of Si, Al, Zr, Ti, and Mg alkoxides.

8. The method of claim 1, wherein said metal acylate is selected from the group consisting of Si, Al, Zr, Ti, and Mg acylates.

9. The method of claim 1, wherein said electrical conductor is a copper conductor, said method further comprising coating said copper conductor with a metal having a heat resistance and an oxidation resistance.

10. The method of claim 9, wherein said heat and oxidation resistant metal is selected from the group consisting of Ni, Pt, and stainless steel.

11. The method of claim 1, comprising making said electrical conductor of an anodizable metal.

12. The method of claim 1, comprising making said electrical conductor of copper and coating said copper conductor with an anodizable metal.

13. The method of claim 1, wherein said initial surface roughness Ra1 is several microns and said finish surface roughness Ra2 is 0.2 μm or less.

14. The method of claim 13, wherein said initial surface roughness Ra1 is 2 to 3 μm, and said finish surface roughness is 0.1 μm.

* * * * *

UNITED STATES PATENT AND TRADEMARK OFFICE
CERTIFICATE OF CORRECTION

PATENT NO. : 5,296,260

DATED : March 22, 1994

INVENTOR(S) : Kazuo Sawada, et al.

It is certified that error appears in the above-identified patent and that said Letters Patent is hereby corrected as shown below:

On the title page, item [30]: The second priority should read
--December 28, 1989 [JP] Japan ................1-341392--.

Signed and Sealed this

Seventh Day of March, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,296,260
DATED : March 22, 1994
INVENTOR(S) : Kazuo Sawada, et al.

It is certified that error appears in the above-indentified patent and that said Letters Patent is hereby corrected as shown below:

The title page, should be deleted to appear as per attached title page.

Columns 1-8, should be deleted to be replaced with the attached columns 1-8.

Signed and Sealed this

Twentieth Day of June, 1995

BRUCE LEHMAN

Attest:

Attesting Officer

Commissioner of Patents and Trademarks

United States Patent
Sawada et al.

[11] Patent Number: 5,296,260
[45] Date of Patent: Mar. 22, 1994

[54] METHOD OF MANUFACTURING INORGANIC INSULATION

[75] Inventors: Kazuo Sawada; Shinji Inazawa; Kouichi Yamada, all of Osaka, Japan

[73] Assignee: Sumitomo Electric Industries, Ltd., Osaka, Japan

[21] Appl. No.: 743,429
[22] PCT Filed: Dec. 26, 1990
[86] PCT No.: PCT/JP90/01701
§ 371 Date: Aug. 22, 1991
§ 102(e) Date: Aug. 22, 1991
[87] PCT Pub. No.: WO91/10239
PCT Pub. Date: Jul. 11, 1991

[30] Foreign Application Priority Data

Dec. 28, 1989 [JP] Japan .................. 1-341394
Dec. 26, 1990 [JP] Japan .................. 1-341392

[51] Int. Cl.$^5$ ............................. B05N 5/12
[52] U.S. Cl. ........................... 427/118; 427/120; 427/126.3; 427/376.4; 427/387; 427/419.3; 427/427; 427/435; 205/188; 205/209
[58] Field of Search ............ 427/120, 126.3, 376.4, 427/419.3, 387, 435, 118, 427; 205/188, 209

[56] References Cited

U.S. PATENT DOCUMENTS

| 4,269,894 | 5/1981 | Sakai et al. | 427/118 |
| 4,468,420 | 8/1984 | Kawahara et al. | 427/397.7 |
| 4,476,192 | 10/1984 | Imai et al. | 427/118 |
| 4,983,423 | 1/1991 | Goldsmith | 427/383.3 |
| 5,105,531 | 4/1992 | Sawada et al. | 427/118 |
| 5,112,676 | 5/1992 | Cot et al. | 427/126.3 |
| 5,139,820 | 8/1992 | Sawada et al. | 427/120 |

FOREIGN PATENT DOCUMENTS 63-195283 8/1988 Japan .
63-237404 4/1989 Japan .

Primary Examiner—Shrive Beck
Assistant Examiner—Benjamin L. Utech
Attorney, Agent, or Firm—W. G. Fasse

[57] ABSTRACT

An electrical conductor coated with a ceramic insulation film is provided with a smooth surface coating. For this purpose a solution of a ceramic precursor prepared from a metal alkoxide or a metal acylate in a vehicle is applied onto the ceramic insulation film having an irregular, rough surface. The precursor solution fills up any recesses forming the rough film surface. The ceramic precursor solution forming an outer coating is then at least partially changed to the ceramic state by heating, whereby the outer surface is smoothed out. The partly converted outer coating is resistant against rubbing and improves the workability of the conductor and substantially reduces any gas release from the insulated conductor.

14 Claims, 1 Drawing Sheet

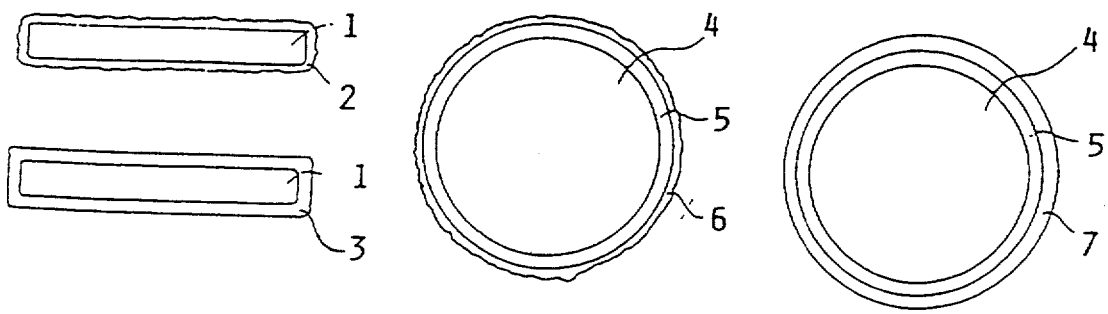

it is possible to easily form a thick ceramic film on the conductor.

BRIEF DESCRIPTION OF THE DRAWINGS

In order that the invention may be clearly understood, it will now be described, by way of example, with reference to the accompanying drawings, wherein:

FIG. 1 is an end view of a rectangular conductor bar showing a rough surface before a solution of a ceramic precursor is applied as taught by the present invention;

FIG. 2 is the same end view as in FIG. 1, but showing a smooth surface after the solution of the ceramic precursor has been applied and the conductor has been fired;

FIG. 3 is an end view of a circular wire showing a rough surface before a solution of a ceramic precursor is applied as taught by the present invention; and FIG. 4 is the same end view as in FIG. 3, but showing a smooth surface after the solution of the ceramic precursor has been applied and the conductor has been fired.

DETAILED DESCRIPTION OF PREFERRED EXAMPLE EMBODIMENTS AND OF THE BEST MODE OF THE INVENTION

First, Examples according to the first embodiment of the present invention are described.

EXAMPLE 1

The surface of a copper plate 6 mm thick and 200 mm wide was coated with $Al_2O_3$ by a plasma spraying method. The $Al_2O_3$ coating film had a thickness of about 0.5 mm, excepting a terminal part. The film surface had irregularities and recesses causing an initial surface roughness Ra1 of several $\mu$m, and the film itself was porous. This state is shown in FIG. 1 wherein a rectangular conductor 1 has been coated with a ceramic film 2 having a rough surface with said initial roughness Ra1. In this Example, the conductor 1 is a copper plate, and the ceramic film 2 is an $Al_2O_3$ coating.

Then, a ceramic precursor solution prepared by adding ethyl alcohol and small amounts of water and nitric acid to tetraethoxysilane was impregnated into the pores, recesses, and irregularities of the ceramic $Al_2O_3$ coating film 2 on the copper plate conductor 1. The solution was sufficiently applied to fill up any irregularities, recesses and pores on the surface of the ceramic film 2. After the application, a heat treatment was performed at 600° C. As the result, an insulation was obtained with a surface that is smooth with no holes. A finish surface "roughness" Ra2 now was 0.2 $\mu$m. This smooth inorganic insulation is shown in FIG. 2 illustrating an insulating layer 3 with a smooth surface formed around the conductor 1. The insulating layer 3 combines the coating film of $Al_2O_3$ with an outer coating layer of $SiO_2$ formed of said ceramic precursor.

The conductor 1 with an inorganic insulation layer 3 was used as a bus bar, whereby it was found to be useful as a bus bar in a high-temperature atmosphere and for carrying a large current with excellent insulation characteristics even if the temperature was in excess of 300° C. A conventional PVC-coated bus bar could not be used unless the temperature was less than 100° C.

EXAMPLE 2

A nickel-plated copper wire having a diameter of 1.0 mm was electropolished in a dilute sulfuric acid bath of 60 wt. % at a current density of 50 A/cm$^2$ for about 30 seconds, using a base material as an anode. Thereafter the polished wire was dipped in colloid which was prepared by mixing 5 g of aluminum nitrate and alumina powder of 0.3 $\mu$m in mean particle diameter to 100 ml of ethyl alcohol, 100 ml of water, 4 ml of isopropyl alcohol and 3 ml of methyl ethyl ketone. A bath voltage of 50 V was applied to a base material forming an anode, to perform an electrodeposition of the alumina powder.

As a result, an extremely irregular, namely rough surfaced, aluminum powder coating was formed on the surface of the conductor. FIG. 3 shows an end view of the wire conductor 4 and its coating on an Ni-plated layer 5 formed around the Cu wire 4. An electrodeposition layer 6 is formed on the surface of the Ni-plated layer 5. The surface roughness Ra of the surface of the electrodeposition layer 6 was 2 to 3 $\mu$m.

Then, the wire with its alumina powder coating was dipped into a solution, which was prepared by reacting a mixed solution of 5 mole percent of tributoxy aluminum, 10 mole percent of triethanol amine, 5 mole percent of water and 80 mole percent of isopropyl alcohol at a temperature of 50° C. for 1 hour, and thereafter fired. The firing was carried out in atmospheric air at a temperature of 500° C.

As a result, a smooth (Ra=0.1 $\mu$m) alumina impregnated insulating layer having a thickness of 20 $\mu$m was formed on the surface of the conductor wire 4.

This state is shown in FIG. 4, wherein the insulating layer 7 has been formed on the nickel layer 5 by applying a ceramic precursor onto the electrodeposition layer 6 and firing the precursor on the wire conductor.

EXAMPLE 3

$Al_2O_3$ was sprayed onto a SUS clad copper conductor, and a solution of a ceramic precursor was prepared by adding nitric acid to a solution prepared by mixing tetrabutylorthosilicate:water:isobutyl alcohol=8:32:60 (molar ratio), at a rate of 3/100 mol. with respect to tetrabutylorthosilicate, and thereafter heating the same at a temperature of 80° C. for 2 hours. This solution of the ceramic precursor was applied to the clad copper conductor and thereafter fired. The resulting insulated conductor was used as a bus bar and as a heat resistant wire, whereby excellent results were obtained.

EXAMPLE 4

A Ti-clad copper conductor was anode-rayed to make the conductor surface porous, and a solution of a ceramic precursor similar to that of Example 3 was applied to the porous surface. The conductor and precursor were fired and thereafter used as a bus bar and a heat resistant wire, whereby excellent results were obtained.

EXAMPLE 5

A porous $SiO_2$ film was formed on an Al/Ni/Cu clad wire, by an electric deposition method, and a solution of a ceramic precursor similar to that of Example 3 was applied to the wire and fired. The resulting insulated wire was used as a bus bar and as a heat resistant wire, whereby excellent results were obtained.

EXAMPLE 6

$Al_2O_3$ was sprayed onto a thermocouple, and a solution of a ceramic precursor similar to that of Example 3 was applied to the $Al_2O_3$ coating, and the coated thermocouple was fired and used as a thermocouple, whereby an excellent result was obtained.

EXAMPLE 7

A precursor solution was prepared by mixing tributoxy aluminum:triethanol amine:water:isopropyl alcohol=5:10:5:80 in molar ratios. The mixed solution was heated and stirred at a temperature of 50° C. for 1 hour. The so prepared ceramic precursor solution was applied to different conductors as in Examples 3 to 6 which were then fired and used as a bus bar, a heat resistant wire, or a thermocouple respectively, whereby excellent results were obtained.

Examples according to the second embodiment of the present invention will now be described.

EXAMPLE 8

A solution was prepared by homogeneously mixing 30 parts by weight of fine grains of $Al_2O_3$ having a particle diameter of 1 $\mu$m with a 30% toluene solution of silicone resin. The weight indication is with respect to silicone resin. This solution was continuously applied to an Ni clad Cu wire having a diameter of 0.5 mm. Then the coated wire was heated in a continuous baking furnace at a furnace temperature of 500° C., to change the film of silicone resin to a ceramic state. The thickness of the resulting ceramic layer on the wire was about 15 $\mu$m, and its breakdown voltage was 350 V.

In this state, the ceramic coating film had a tendency to be at least partly removed in a powder form or in a granular form when the wire was exposed to bending, making it difficult to handle the wire.

To avoid this problem a solution was prepared by adding an isopropyl alcohol solution of tetraethoxysilane, water and a small amount of nitric acid. This further solution was continuously applied onto the wire, and heated in a heating furnace at a temperature of 600° C., to produce a wire having an insulating layer with an apparent total thickness of 18 $\mu$m. The surface of this wire was smooth. Further, this wire hardly caused peeling or removal of the ceramic coating even when the wire was exposed to bending. In addition, the breakdown voltage (B.C.V.) of this wire was 700 V.

EXAMPLE 9

20 parts by weight of $SiO_2$ powder having a particle diameter of 0.7 $\mu$m were homogeneously mixed into a paraxylene 50% solution of silicone resin. The parts by weight indication is with respect to silicone resin. The so prepared solution was applied to an Ni-plated Cu wire having a diameter of 1 mm. The coated wire was heated at 150° C. for 30 minutes, then wound into a coil, and further heated at 400° C. for 30 minutes.

A ceramic precursor solution was prepared by heating and stirring a mixture of tributoxy aluminum:triethanol amine:water:isopropyl alcohol=5:10:5:80 in molar ratio, at a temperature of 50° C. for 1 hour. The resulting ceramic precursor solution was applied onto the surface of the aforementioned coil, and heated at 400° C. for 30 minutes.

The coil, which was thus coated with the ceramic precursor solution and baked, and a second coil, which was in a state before application of the ceramic precursor solution, were subjected to an experiment by generating a magnetic field in a vacuum in the following manner.

Each of the coils was set in a vacuum vessel having a volume of 9.4 l and baking was performed for 2 hours. Each vessel was then evacuated and a direct current of 20 A passed through the coils upon reaching a reduced pressure of $10^{-8}$ Torr in the vessels. About 1 hour was required to reach a reduced pressure of $10^{-9}$ Torr in the case of the second coil which was in the state before application of the ceramic precursor solution. It took about 5 minutes in the case of the first coil which was prepared by applying the precursor solutions as taught by the invention. From this result, it is understood that the surface of the coil which was coated with the precursor solution and sintered is extremely smooth, and has excellent vacuum characteristics.

As hereinabove described, the inorganic insulation on a conductor produced according to the present invention has an excellent heat resistance, insulability, oxidation resistance and flexibility. Therefore, it is effective when applied to a radiation resistant wire or coil which is used in nuclear power equipment, or a wire or coil for use in a vacuum apparatus or the like.

We claim:

1. A method for manufacturing on an electrical conductor an inorganic insulation with a smooth surface finish measured as a finish surface roughness Ra2, comprising the following steps:
    (a) forming a ceramic coating film on said electrical conductor, mixing silicone resin with ceramic particles and/or ceramic fibers to form a mixture, applying said mixture to said electrical conductor to form a coating film, first heating said coating film at a first temperature sufficiently low so that said silicone resin is not changed into a ceramic state and then second heating said coating film at a second higher temperature to convert said silicone resin into said ceramic coating film with said ceramic particles and/or fibers embedded in said ceramic coating film, whereby said ceramic coating film has a film surface with an initial surface roughness Ra1,
    (b) preparing a solution of a ceramic precursor selected from the group consisting of metal alkoxides and metal acylates,
    (c) applying said ceramic precursor solution to said film surface of said ceramic coating film, and
    (d) heating said ceramic precursor solution sufficiently to convert said ceramic precursor solution at least partially to a ceramic state, whereby said initial surface roughness Ra1 is reduced and a smooth, dense composite insulator layer is formed on said electrical conductor, wherein said finish surface roughness Ra2 is smaller than said initial surface roughness Ra1.

2. The method of claim 1, wherein said ceramic coating film is formed so that said initial surface roughness Ra1 forms pores in said ceramic coating film, and wherein said ceramic precursor solution is caused to fill said pores to smooth said initial surface roughness Ra1.

3. The method of claim 1, further comprising working said electrical conductor into a configuration following said step of forming said ceramic coating film and prior to said step of applying said ceramic precursor solution.

4. The method of claim 1, wherein said step of applying said ceramic coating film is performed by any one of the following: spraying, sintering, and electric deposition.

5. The method of claim 1, further comprising working said electrical conductor wire into a configuration between said first and second heating.

6. The method of claim 1, wherein said step of applying said ceramic precursor solution is performed by dipping said electrical conductor with said ceramic coating film thereon, into said ceramic precursor solution.

7. The method of claim 1, wherein said metal alkoxide is selected from the group consisting of Si, Al, Zr, Ti, and Mg alkoxides.

8. The method of claim 1, wherein said metal acylate is selected from the group consisting of Si, Al, Zr, Ti, and Mg acylates.

9. The method of claim 1, wherein said electrical conductor is a copper conductor, said method further comprising coating said copper conductor with a metal having a heat resistance and an oxidation resistance.

10. The method of claim 9, wherein said heat and oxidation resistant metal is selected from the group consisting of Ni, Pt, and stainless steel.

11. The method of claim 1, comprising making said electrical conductor of an anodizable metal.

12. The method of claim 1, comprising making said electrical conductor of copper and coating said copper conductor with an anodizable metal.

13. The method of claim 1, wherein said initial surface roughness Ra1 is several microns and said finish surface roughness Ra2 is 0.2 $\mu$m or less.

14. The method of claim 13, wherein said initial surface roughness Ra1 is 2 to 3 $\mu$m, and said finish surface roughness is 0.1 $\mu$m.

* * * * *

UNITED STATES PATENT AND TRADEMARK OFFICE
CERTIFICATE OF CORRECTION

PATENT NO. : 5,296,260
DATED : March 22, 1994
INVENTOR(S) : Kazuo Sawada, et al.

It is certified that error appears in the above-indentified patent and that said Letters Patent is hereby corrected as shown below:

The title page, should be deleted to appear as per attached title page.

Columns 1-8, should be deleted to be replaced with the attached columns 1-8.

This certificate supersedes Certificate of Correction issued June 20, 1995.

Signed and Sealed this

Ninth Day of July, 1996

Attest:

BRUCE LEHMAN

Attesting Officer

Commissioner of Patents and Trademarks

United States Patent [19]

Sawada et al.

[11] Patent Number: 5,296,260
[45] Date of Patent: Mar. 22, 1994

[54] METHOD OF MANUFACTURING INORGANIC INSULATION

[75] Inventors: Kazuo Sawada; Shinji Inazawa; Kouichi Yamada, all of Osaka, Japan

[73] Assignee: Sumitomo Electric Industries, Ltd., Osaka, Japan

[21] Appl. No.: 743,429

[22] PCT Filed: Dec. 26, 1990

[86] PCT No.: PCT/JP90/01701
§ 371 Date: Aug. 22, 1991
§ 102(e) Date: Aug. 22, 1991

[87] PCT Pub. No.: WO91/10239
PCT Pub. Date: Jul. 11, 1991

[30] Foreign Application Priority Data

Dec. 28, 1989 [JP] Japan .................. 1-341394
Dec. 26, 1990 [JP] Japan .................. 1-341392

[51] Int. Cl.⁵ .................................. B05N 5/12
[52] U.S. Cl. .................................. 427/118; 427/120;
427/126.3; 427/376.4; 427/387; 427/419.3;
427/427; 427/435; 205/188; 205/209
[58] Field of Search .............. 427/120, 126.3, 376.4,
427/419.3, 387, 435, 118, 427; 205/188, 209

[56] References Cited

U.S. PATENT DOCUMENTS

| 4,269,894 | 5/1981 | Sakai et al. | 427/118 |
| 4,468,420 | 8/1984 | Kawahara et al. | 427/397.7 |
| 4,476,192 | 10/1984 | Imai et al. | 427/118 |
| 4,983,423 | 1/1991 | Goldsmith | 427/383.3 |
| 5,105,531 | 4/1992 | Sawada et al. | 427/118 |
| 5,112,676 | 5/1992 | Cot et al. | 427/126.3 |
| 5,139,820 | 8/1992 | Sawada et al. | 427/120 |

FOREIGN PATENT DOCUMENTS 63-195283 8/1988 Japan .
63-237404 4/1989 Japan .

Primary Examiner—Shrive Beck
Assistant Examiner—Benjamin L. Utech
Attorney, Agent, or Firm—W. G. Fasse

[57] ABSTRACT

An electrical conductor coated with a ceramic insulation film is provided with a smooth surface coating. For this purpose a solution of a ceramic precursor prepared from a metal alkoxide or a metal acylate in a vehicle is applied onto the ceramic insulation film having an irregular, rough surface. The precursor solution fills up any recesses forming the rough film surface. The ceramic precursor solution forming an outer coating is then at least partially changed to the ceramic state by heating, whereby the outer surface is smoothed out. The partly converted outer coating is resistant against rubbing and improves the workability of the conductor and substantially reduces any gas release from the insulated conductor.

14 Claims, 1 Drawing Sheet

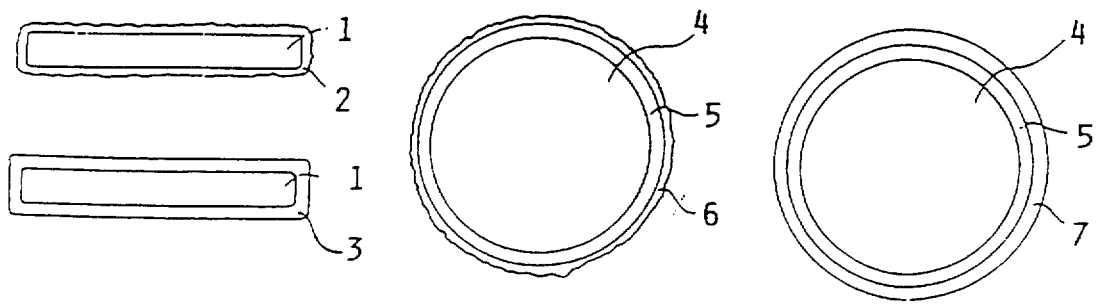

METHOD OF MANUFACTURING INORGANIC INSULATION

FIELD OF THE INVENTION

The present invention relates to a method of manufacturing an inorganic insulation on an electrical conductor, such as a heat resistant conductor wire, a radiation resistant conductor wire or bar. Such conductors are used for example in nuclear power equipment, in a vacuum apparatus, or the like.

BACKGROUND INFORMATION

Conventional heat resistant electrical conductors are known as MI cable, as fiber-glass braided wire, or a wire encased in a ceramic tube. However, these conventional conductors are bulky and hence require substantial space for their installation. Further, conventional conductors of this type have the disadvantage that their configuration is restricted to a round cross-section.

While a heat resistant conductor wire coated on its surface with an organic insulation material is also known, such a wire cannot withstand a temperature exceeding 300° C. Thus, the heat resistance of such a conductor wire is inadequate. Further, such wires discharge gas caused by decomposition or gas adsorbed in the organic insulation.

It is known to apply a ceramic precursor to a surface of a heat resistant wire, by a sol-gel method or by the Nippon Sheet Glass method also known as the Liquid Phase Deposition (LPD) method. However, these methods take time for producing increased film thicknesses, which is a problem.

Another known method involves applying a mixture which is obtained by mixing ceramic particles into silicone resin, onto the surface of a wire or the like and thereafter heating or firing the coated wire. However, said method results in a wire coating having an irregular, rough surface and whereby the coating is weak against rubbing. Besides, such a coating does not have the desired flexibility.

When coating films are formed by a spraying method or by a sintering method, the resulting surfaces are irregular or porous, which is also a problem.

SUMMARY OF THE INVENTION

It is an object of the present invention to provide a method of manufacturing an inorganic insulation on an electrical conductor which is easy to industrialize and has an improved workability. The insulation shall have an improved ability to insulate referred to as insulability and it shall be reliable against outgassing.

The manufacturing method according to the present invention comprises the following steps. First, a ceramic film having an irregular, rough surface is formed on a conductor surface. Second, a solution of a ceramic precursor prepared of at least one or two types of metal alkoxides or metal acylates to the ceramic film whereby the roughness on the surface of the ceramic film is smoothed out. Third, the solution of the ceramic precursor is at least partially changed to the ceramic state by heating.

In the present invention, the ceramic film having an irregular, rough surface has a surface roughness Ra of at least 1 μm. The rough ceramic film surface may even be porous before the application of the ceramic precursor solution.

In a first embodiment according to the present invention, a ceramic film is formed on the conductor surface by a spraying method, by a particle sintering method, or by an electric deposition method to form a coated conductor which can be worked into a desired configuration before application of the ceramic precursor solution.

In a second embodiment according to the present invention, the ceramic film is first formed by applying a mixture of silicone resin and ceramic particles and/or ceramic fibers onto the surface of the conductor to form a coated conductor. The coated conductor is then subjected to two heat treatments. The first heat treatment is performed within such a temperature range that the silicone resin is not changed to a ceramic state. The second heat treatment is performed at a temperature sufficient for changing the silicone resin into a ceramic state.

When it is desirable to work the conductor of this second embodiment into a desired configuration, the conductor is preferably worked into the desired configuration after the first heat treatment and before the second heat treatment.

The second heat treatment is preferably so performed that at least 90% of the silicone resin is changed to the ceramics state. The ceramic precursor is prepared of an alkoxide of Si, Al, Zr, Ti, or Mg or an acylate of Si, Al, Zr, Ti, or Mg, for example.

The conductor employed in the present invention is preferably made of Cu which is coated with a metal having the required heat resistance and oxidation resistance. For example Ni, Pt, and stainless steel meet these requirements.

According to the present invention, the conductor can be made of an anodizable metal or Cu which is coated with such an anodizable metal. It is possible to improve the adhesion between the conductor and the ceramic film by first anodizing the surface of the conductor.

The electric deposition method is an example for forming the ceramic film, whereby an Al conductor is dipped into an aqueous solution containing silicate where the coating film is $Al_2O_3$ or $SiO_2$, for example, and using the Al conductor as a cathode for feeding a current through the aqueous solution thereby causing spark discharge for depositing an $Al_2O_3$ film or an $SiO_2$ film on the surface of the Al conductor.

By applying the solution of a ceramic precursor to the rough surface of the ceramic film as taught by the present invention, the irregularities and roughness is smoothed out, whereby the above described disadvantages e.g., a weakness against rubbing and an inferior workability, are substantially avoided. Further, gas discharges from the insulation under high operating temperatures are also avoided.

It is possible to partially change the ceramic precursor to a ceramic state and to bring the remaining precursor into a gel state which imparts flexibility to the film. Such a partial change is accomplished by selecting the condition for the heat treatment after application of the ceramic precursor to the ceramic film.

According to the second embodiment of the present invention, the mixture of silicone resin and ceramic particles and/or ceramic fiber is applied and thereafter the ceramic film is formed by heat treatment, whereby it is possible to easily form a thick ceramic film on the conductor.

BRIEF DESCRIPTION OF THE DRAWINGS

In order that the invention may be clearly understood, it will now be described, by way of example, with reference to the accompanying drawings, wherein:

FIG. 1 is an end view of a rectangular conductor bar showing a rough surface before a solution of a ceramic precursor is applied as taught by the present invention;

FIG. 2 is the same end view as in FIG. 1, but showing a smooth surface after the solution of the ceramic precursor has been applied and the conductor has been fired;

FIG. 3 is an end view of a circular wire showing a rough surface before a solution of a ceramic precursor is applied as taught by the present invention; and FIG. 4 is the same end view as in FIG. 3, but showing a smooth surface after the solution of the ceramic precursor has been applied and the conductor has been fired.

DETAILED DESCRIPTION OF PREFERRED EXAMPLE EMBODIMENTS AND OF THE BEST MODE OF THE INVENTION

First, Examples according to the first embodiment of the present invention are described.

EXAMPLE 1

The surface of a copper plate 6 mm thick and 200 mm wide was coated with $Al_2O_3$ by a plasma spraying method. The $Al_2O_3$ coating film had a thickness of about 0.5 mm, excepting a terminal part. The film surface had irregularities and recesses causing an initial surface roughness Ra1 of several $\mu m$, and the film itself was porous. This state is shown in FIG. 1 wherein a rectangular conductor 1 has been coated with a ceramic film 2 having a rough surface with said initial roughness Ra1. In this Example, the conductor 1 is a copper plate, and the ceramic film 2 is an $Al_2O_3$ coating.

Then, a ceramic precursor solution prepared by adding ethyl alcohol and small amounts of water and nitric acid to tetraethoxysilane was impregnated into the pores, recesses, and irregularities of the ceramic $Al_2O_3$ coating film 2 on the copper plate conductor 1. The solution was sufficiently applied to fill up any irregularities, recesses and pores on the surface of the ceramic film 2. After the application, a heat treatment was performed at 600° C. As the result, an insulation was obtained with a surface that is smooth with no holes. A finish surface "roughness" Ra2 now was 0.2 $\mu m$. This smooth inorganic insulation is shown in FIG. 2 illustrating an insulating layer 3 with a smooth surface formed around the conductor 1. The insulating layer 3 combines the coating film of $Al_2O_3$ with an outer coating layer of $SiO_2$ formed of said ceramic precursor.

The conductor 1 with an inorganic insulation layer 3 was used as a bus bar, whereby it was found to be useful as a bus bar in a high-temperature atmosphere and for carrying a large current with excellent insulation characteristics even if the temperature was in excess of 300° C. A conventional PVC-coated bus bar could not be used unless the temperature was less than 100° C.

EXAMPLE 2

A nickel-plated copper wire having a diameter of 1.0 mm was electropolished in a dilute sulfuric acid bath of 60 wt. % at a current density of 50 $A/cm^2$ for about 30 seconds, using a base material as an anode. Thereafter the polished wire was dipped in colloid which was prepared by mixing 5 g of aluminum nitrate and alumina powder of 0.3 $\mu m$ in mean particle diameter to 100 ml of ethyl alcohol, 100 ml of water, 4 ml of isopropyl alcohol and 3 ml of methyl ethyl ketone. A bath voltage of 50 V was applied to a base material forming an anode, to perform an electrodeposition of the alumina powder.

As a result, an extremely irregular, namely rough surfaced, aluminum powder coating was formed on the surface of the conductor. FIG. 3 shows an end view of the wire conductor 4 and its coating on an Ni-plated layer 5 formed around the Cu wire 4. An electrodeposition layer 6 is formed on the surface of the Ni-plated layer 5. The surface roughness Ra of the surface of the electrodeposition layer 6 was 2 to 3 $\mu m$.

Then, the wire with its alumina powder coating was dipped into a solution, which was prepared by reacting a mixed solution of 5 mole percent of tributoxy aluminum, 10 mole percent of triethanol amine, 5 mole percent of water and 80 mole percent of isopropyl alcohol at a temperature of 50° C. for 1 hour, and thereafter fired. The firing was carried out in atmospheric air at a temperature of 500° C.

As a result, a smooth (Ra=0.1 $\mu m$) alumina impregnated insulating layer having a thickness of 20 $\mu m$ was formed on the surface of the conductor wire 4.

This state is shown in FIG. 4, wherein the insulating layer 7 has been formed on the nickel layer 5 by applying a ceramic precursor onto the electrodeposition layer 6 and firing the precursor on the wire conductor.

EXAMPLE 3

$Al_2O_3$ was sprayed onto a SUS clad copper conductor, and a solution of a ceramic precursor was prepared by adding nitric acid to a solution prepared by mixing tetrabutylorthosilicate:water:isobutyl alcohol=8:32:60 (molar ratio), at a rate of 3/100 mol. with respect to tetrabutylorthosilicate, and thereafter heating the same at a temperature of 80° C. for 2 hours. This solution of the ceramic precursor was applied to the clad copper conductor and thereafter fired. The resulting insulated conductor was used as a bus bar and as a heat resistant wire, whereby excellent results were obtained.

EXAMPLE 4

A Ti-clad copper conductor was anode-rayed to make the conductor surface porous, and a solution of a ceramic precursor similar to that of Example 3 was applied to the porous surface. The conductor and precursor were fired and thereafter used as a bus bar and a heat resistant wire, whereby excellent results were obtained.

EXAMPLE 5

A porous $SiO_2$ film was formed on an Al/Ni/Cu clad wire, by an electric deposition method, and a solution of a ceramic precursor similar to that of Example 3 was applied to the wire and fired. The resulting insulated wire was used as a bus bar and as a heat resistant wire, whereby excellent results were obtained.

EXAMPLE 6

$Al_2O_3$ was sprayed onto a thermocouple, and a solution of a ceramic precursor similar to that of Example 3 was applied to the $Al_2O_3$ coating, and the coated thermocouple was fired and used as a thermocouple, whereby an excellent result was obtained.

EXAMPLE 7

A precursor solution was prepared by mixing tributoxy aluminum:triethanol amine:water:isopropyl alcohol = 5:10:5:80 in molar ratios. The mixed solution was heated and stirred at a temperature of 50° C. for 1 hour. The so prepared ceramic precursor solution was applied to different conductors as in Examples 3 to 6 which were then fired and used as a bus bar, a heat resistant wire, or a thermocouple respectively, whereby excellent results were obtained.

Examples according to the second embodiment of the present invention will now be described.

EXAMPLE 8

A solution was prepared by homogeneously mixing 30 parts by weight of fine grains of $Al_2O_3$ having a particle diameter of 1 μm with a 30% toluene solution of silicone resin. The weight indication is with respect to silicone resin. This solution was continuously applied to an Ni clad Cu wire having a diameter of 0.5 mm. Then the coated wire was heated in a continuous baking furnace at a furnace temperature of 500° C., to change the film of silicone resin to a ceramic state. The thickness of the resulting ceramic layer on the wire was about 15 μm, and its breakdown voltage was 350 V.

In this state, the ceramic coating film had a tendency to be at least partly removed in a powder form or in a granular form when the wire was exposed to bending, making it difficult to handle the wire.

To avoid this problem a solution was prepared by adding an isopropyl alcohol solution of tetraethoxysilane, water and a small amount of nitric acid. This further solution was continuously applied onto the wire, and heated in a heating furnace at a temperature of 600° C., to produce a wire having an insulating layer with an apparent total thickness of 18 μm. The surface of this wire was smooth. Further, this wire hardly caused peeling or removal of the ceramic coating even when the wire was exposed to bending. In addition, the breakdown voltage (B.C.V.) of this wire was 700 V.

EXAMPLE 9

20 parts by weight of $SiO_2$ powder having a particle diameter of 0.7 μm were homogeneously mixed into a paraxylene 50% solution of silicone resin. The parts by weight indication is with respect to silicone resin. The so prepared solution was applied to an Ni-plated Cu wire having a diameter of 1 mm. The coated wire was heated at 150° C. for 30 minutes, then wound into a coil, and further heated at 400° C. for 30 minutes.

A ceramic precursor solution was prepared by heating and stirring a mixture of tributoxy aluminum:triethanol amine:water:isopropyl alcohol = 5:10:5:80 in molar ratio, at a temperature of 50° C. for 1 hour. The resulting ceramic precursor solution was applied onto the surface of the aforementioned coil, and heated at 400° C. for 30 minutes.

The coil, which was thus coated with the ceramic precursor solution and baked, and a second coil, which was in a state before application of the ceramic precursor solution, were subjected to an experiment by generating a magnetic field in a vacuum in the following manner.

Each of the coils was set in a vacuum vessel having a volume of 9.4 l and baking was performed for 2 hours. Each vessel was then evacuated and a direct current of 20 A passed through the coils upon reaching a reduced pressure of $10^{-8}$ Torr in the vessels. About 1 hour was required to reach a reduced pressure of $10^{-9}$ Torr in the case of the second coil which was in the state before application of the ceramic precursor solution. It took about 5 minutes in the case of the first coil which was prepared by applying the precursor solutions as taught by the invention. From this result, it is understood that the surface of the coil which was coated with the precursor solution and sintered is extremely smooth, and has excellent vacuum characteristics.

As hereinabove described, the inorganic insulation on a conductor produced according to the present invention has an excellent heat resistance, insulability, oxidation resistance and flexibility. Therefore, it is effective when applied to a radiation resistant wire or coil which is used in nuclear power equipment, or a wire or coil for use in a vacuum apparatus or the like.

We claim:

1. A method for manufacturing on an electrical conductor an inorganic insulation with a smooth surface finish measured as a finish surface roughness Ra2, comprising the following steps:
   (a) forming a ceramic coating film on said electrical conductor, mixing silicone resin with ceramic particles and/or ceramic fibers to form a mixture, applying said mixture to said electrical conductor to form a coating film, first heating said coating film at a first temperature sufficiently low so that said silicone resin is not changed into a ceramic state and then second heating said coating film at a second higher temperature to convert said silicone resin into said ceramic coating film with said ceramic particles and/or fibers embedded in said ceramic coating film, whereby said ceramic coating film has a film surface with an initial surface roughness Ra1,
   (b) preparing a solution of a ceramic precursor selected from the group consisting of metal alkoxides and metal acylates,
   (c) applying said ceramic precursor solution to said film surface of said ceramic coating film, and
   (d) heating said ceramic precursor solution sufficiently to convert said ceramic precursor solution at least partially to a ceramic state, whereby said initial surface roughness Ra1 is reduced and a smooth, dense composite insulator layer is formed on said electrical conductor, wherein said finish surface roughness Ra2 is smaller than said initial surface roughness Ra1.

2. The method of claim 1, wherein said ceramic coating film is formed so that said initial surface roughness Ra1 forms pores in said ceramic coating film, and wherein said ceramic precursor solution is caused to fill said pores to smooth said initial surface roughness Ra1.

3. The method of claim 1, further comprising working said electrical conductor into a configuration following said step of forming said ceramic coating film and prior to said step of applying said ceramic precursor solution.

4. The method of claim 1, wherein said step of applying said ceramic coating film is performed by any one of the following: spraying, sintering, and electric deposition.

5. The method of claim 1, further comprising working said electrical conductor wire into a configuration between said first and second heating.

6. The method of claim 1, wherein said step of applying said ceramic precursor solution is performed by dipping said electrical conductor with said ceramic coating film thereon, into said ceramic precursor solution.

7. The method of claim 1, wherein said metal alkoxide is selected from the group consisting of Si, Al, Zr, Ti, and Mg alkoxides.

8. The method of claim 1, wherein said metal acylate is selected from the group consisting of Si, Al, Zr, Ti, and Mg acylates.

9. The method of claim 1, wherein said electrical conductor is a copper conductor, said method further comprising coating said copper conductor with a metal having a heat resistance and an oxidation resistance.

10. The method of claim 9, wherein said heat and oxidation resistant metal is selected from the group consisting of Ni, Pt, and stainless steel.

11. The method of claim 1, comprising making said electrical conductor of an anodizable metal.

12. The method of claim 1, comprising making said electrical conductor of copper and coating said copper conductor with an anodizable metal.

13. The method of claim 1, wherein said initial surface roughness Ra1 is several microns and said finish surface roughness Ra2 is 0.2 $\mu$m or less.

14. The method of claim 13, wherein said initial surface roughness Ra1 is 2 to 3 $\mu$m, and said finish surface roughness is 0.1 $\mu$m.

* * * * *